United States Patent [19]
Jennings

[11] Patent Number: 5,231,826
[45] Date of Patent: Aug. 3, 1993

[54] WING EXTENSION FOR WINDROW INVERTERS

[75] Inventor: Richard E. Jennings, Manheim, Pa.

[73] Assignee: Ford New Holland, Inc., New Holland, Pa.

[21] Appl. No.: 907,344

[22] Filed: Jul. 1, 1992

[51] Int. Cl.$^5$ .............. A01D 57/12; A01D 57/28; A01D 69/03; A01D 78/16

[52] U.S. Cl. .................. 56/11.4; 56/10.9; 56/11.9; 56/16.4; 56/14.8; 56/16.3; 56/372

[58] Field of Search .............. 56/16.4, 16.3, 10.8, 56/10.9, 11.4, 11.9, 16.9, 364, 370, 372, 366, DIG. 21

[56] References Cited

U.S. PATENT DOCUMENTS

| | | | |
|---|---|---|---|
| 2,761,270 | 9/1956 | Blaser et al. | 56/370 |
| 3,722,191 | 3/1973 | Braunberger | 56/372 X |
| 4,472,605 | 9/1984 | Ender, Sr. | 56/372 |
| 4,738,092 | 4/1988 | Jennings | 56/372 |
| 4,793,125 | 12/1988 | Ehrhart | 56/16.1 |
| 4,793,129 | 12/1988 | Erhart et al. | 56/370 |

*Primary Examiner*—Stephen J. Novosad
*Attorney, Agent, or Firm*—Larry W. Miller; Frank A. Seemar

[57] ABSTRACT

A windrow inverter having a crop pick-up mechanism operable to elevate a windrow of crop material from the ground onto a transversely moveable draper conveyor is disclosed wherein a wing draper attachment mounted on the frame of the windrow inverter on the opposing side of the transverse cross conveyor from the discharge chute. The wing extension is moveable between a raised transport position and a lowered operating position and is latched into the selected position by a latching mechanism. A hydraulic system is provided to operatively drive the draper for the wing extension and the cross conveyor in opposing directions to permit the windrow inverter to be utilized to discharge windrows of crop material to either selected side of the windrow inverter. The drive mechanism utilizes a selective combination of a mechanical ground drive and a hydraulic drive to power the operation of the pick-up mechanism, cross conveyor and wing attachment.

12 Claims, 8 Drawing Sheets

WING EXTENSION FOR WINDROW INVERTERS

BACKGROUND OF THE INVENTION

This invention relates generally to crop harvesting machines and, more particularly, to a windrow inverter operable to work windrows of crop material lying on the ground.

Windrow inverters, such as described in U.S. Pat. No. 4,793,125, issued on Dec. 27, 1988, to Philip J. Ehrhart and Bryant F. Webb, have been utilized to engage a windrow of crop material lying on the ground, elevate the windrow of crop material, convey the windrow of crop material transversely of its original position on the ground, and invert the windrow of crop material by passing the windrow through a discharge chute positioned transversely of the cross conveyor. Such a windrow inverter is operable only to transversely shift and invert a windrow of crop material, although the windrow inverter embodiment described in U.S. Pat. No. 4,738,092, issuing on Apr. 19, 1988, to Richard E. Jennings, provides for a windrow inverter that can be operable to merely shift the windrow of crop material to dryer ground laterally to one side of its original position on the ground.

It has been found desirable that, particularly in light crop conditions, to position two windrows of crop material adjacent to one another, thereby increasing hay volume for future operations, such as baling or other harvesting procedures. Accordingly, it would be desirable to provide a windrow inverter that would be operable in a selected manner to laterally shift windrows to either side of the machine to permit a doubling of windrows of crop material beside one another.

SUMMARY OF THE INVENTION

It is an object of this invention to overcome the aforementioned disadvantages of the prior art by providing a wing extension for a windrow inverter to permit the discharge of a windrow of crop material outboard of the windrow inverter to the opposite side of the discharge chute thereof.

It is a feature of this invention that the wing extension attachment is moveable between a lowered operative position and a raised transport position.

It is an advantage of this invention that the overall transport width of the windrow inverter equipped with a wing extension can be minimized by shifting the wing extension into a raised transport position.

It is another object of this invention to provide a windrow inverter structure in which the cross conveyor draper is selectively operable to transversely convey a windrow of crop material in either selected direction.

It is another advantage of this invention that the wing extension permits a windrow of crop material to be discharged outboard of the wheels for the windrow inverter.

It is still another advantage of this invention that the wing extension permits the windrow of crop material to be deposited adjacent to or on top of a previously deposited windrow of crop material.

It is still another object of this invention to provide a hydraulic system that includes a hydraulic circuit that permitting the direction of operation of the cross conveyor and wing extension to be selectively switched.

It is another feature of this invention that the windrow inverter includes a hydraulic drive mechanism which selectively permits the draper cross conveyor to be operated in either opposing direction.

It is still another object of this invention that the drive mechanism for the windrow inverter can be selectively positioned to utilize either a ground drive mechanism or a hydraulic drive mechanism.

It is still another feature of this invention to provide a drive mechanism that is selectively operable to drive the pick-up apparatus either hydraulically or through a mechanical ground drive.

It is still another object of this invention to provide a hydraulic circuit that is operable with a tractor having either an open hydraulic system or a closed hydraulic system.

It is still another feature of this invention that the hydraulic circuit can provide different preset speeds of operation of the cross conveyor relative to the opposing directions of operation.

It is still another advantage of this invention that the hydraulic circuit is adaptable to both open and closed hydraulic systems without requiring expensive hydraulic components.

It is yet another advantage of this invention to provide a windrow inverter having greater operational capabilities than heretofore known.

It is yet another object of this invention to provide a latching mechanism for retaining the wing extension in both the lowered operative position and in the raised transport position.

It is still another feature of this invention that the latching mechanism for the wing extension locks automatically when the wing extension is placed into the transport position.

It is a further advantage of this invention that the latching mechanism can be adjusted to require a compression thereof to permit a latching of the wing extension in the lowered operative position.

It is a further object of this invention to utilize a windrow inverter for the operation of merging windrows.

It is yet a further object of this invention to provide a wing extension for a windrow inverter which is durable in construction, inexpensive of manufacture, carefree of maintenance, facile in assemblage, and simple and effective in use.

These and other objects, features and advantages are accomplished according to the instant invention by providing a windrow inverter having a crop pick-up mechanism operable to elevate a windrow of crop material from the ground onto a transverse moveable draper cross conveyor and a wing draper attachment mounted on the frame of the windrow inverter on the opposing side of the transverse cross conveyor from the discharge chute. The wing extension is moveable between a raised transport position and a lowered operating position and is latched into the selected position by a latching mechanism. A hydraulic system is provided to operatively drive the draper for the wing extension and the cross conveyor in opposing directions to permit the windrow inverter to be utilized to discharge windrows of crop material to either selected side of the windrow inverter. The drive mechanism utilizes a selective combination of a mechanical ground drive and a hydraulic drive to power the operation of the pick-up mechanism, cross conveyor and wing attachment.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
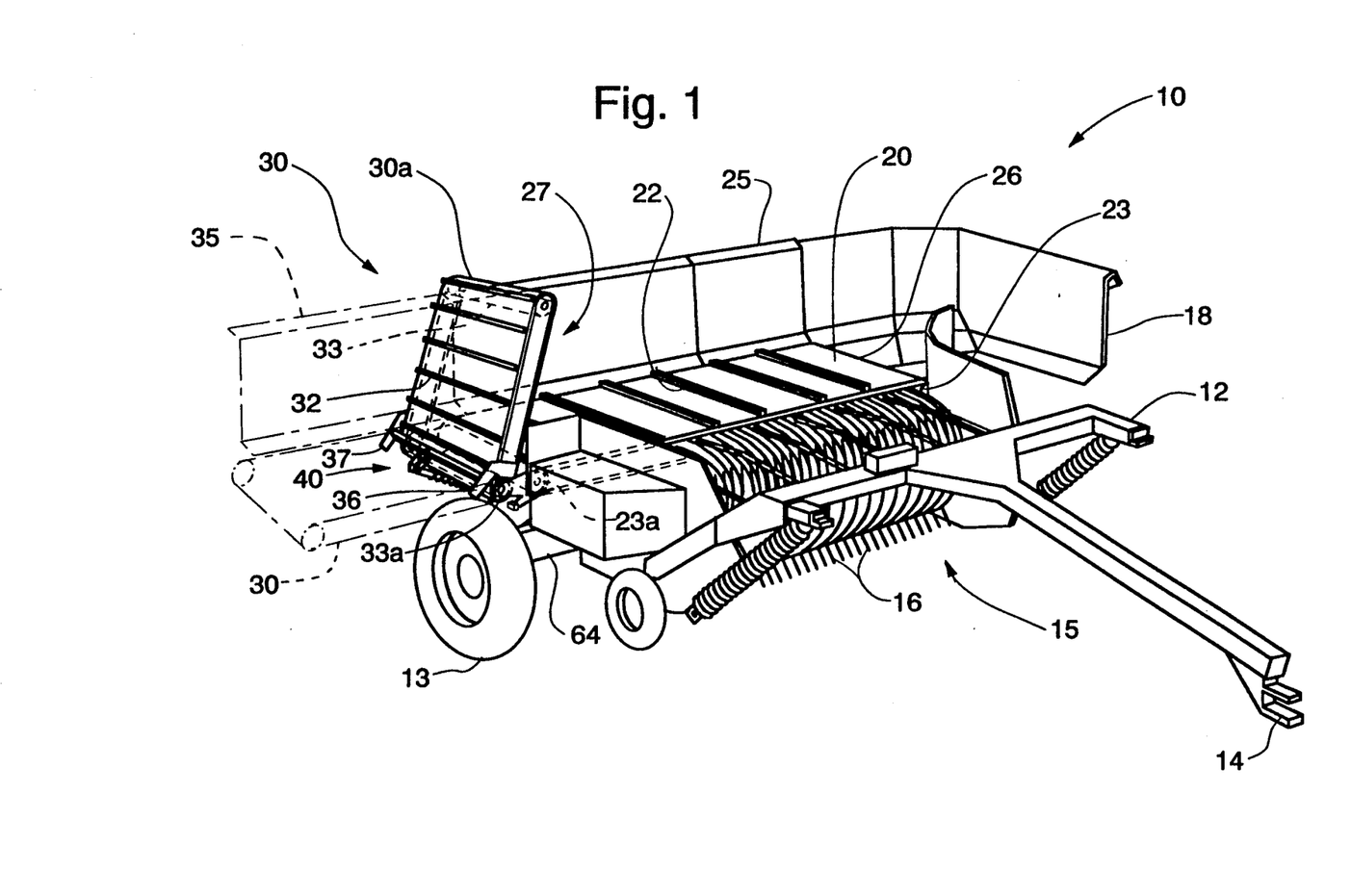
FIG. 1 is a right front prospective view of a windrow inverter incorporating the principles of the instant invention, the wing extension being shown in the raised transport position with the lowered operative position of the wing extension being shown in phantom as is a transverse extension of the back wall of the windrow inverter.
Figure 2:
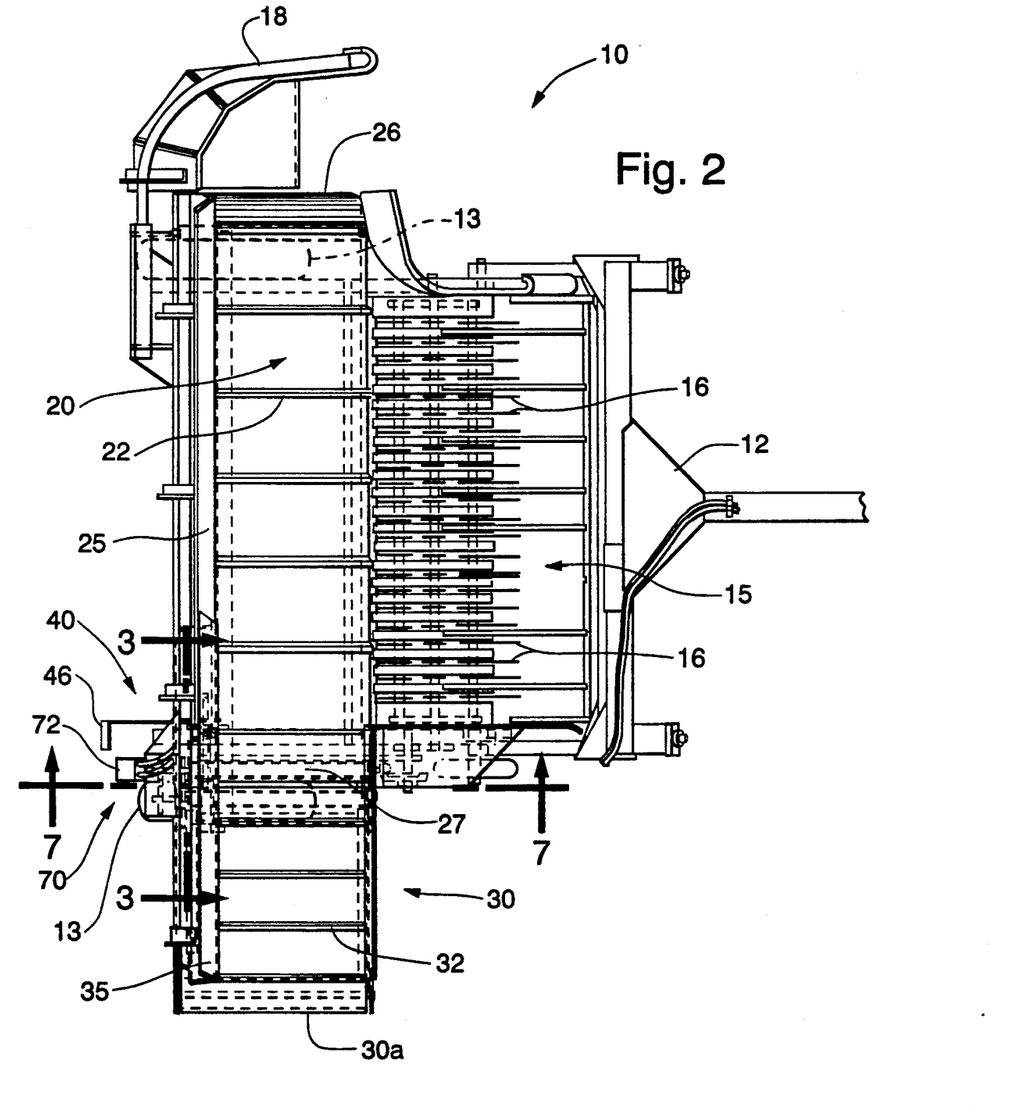
FIG. 2 is a top plan view of the windrow inverter with the wing extension positioned in the lowered operative position, the forward portion of the hitch mechanism being broken away for purposes of clarity.

Referring now to FIGS. 1 and 2 a windrow inverter 10 incorporating the principles of the instant invention can best be seen. Any left and right references are used as a matter of convenience and are determined by standing at the rear of the machine facing the hitch at the forward end, the direction of travel. The details of the windrow inverter frame are described in detail in U.S. Pat. No. 4,793,125, issuing on Dec. 27, 1988, the descriptive portions thereof being incorporated herein by reference.

The windrow inverter 10 is provided with a frame 12 supported above the ground by a pair of transversely disposed ground wheels 13. The frame 12 is also provided with a hitch 14 which is adapted in a conventional manner for connection to a prime mover, such as a tractor as described in the aforementioned U.S. Pat. No. 4,793,125. The frame 12 supports a rotating tine pick-up mechanism 15 operable to engage a windrow of crop material on the ground and elevate the windrow unto a rearwardly positioned cross conveyor 20. The pick-up mechanism includes a plurality of tines 16 and is described in greater detail in U.S. Pat. No. 4,793,129, issuing on Dec. 27, 1988, to Philip J. Ehrhart, the descriptive portions thereof being incorporated herein by reference.

The cross conveyor 20 is shown to be of the endless draper type having a slatted draper 22 entrained around longitudinally extending, laterally spaced rollers 23 to form a conveying mechanism to transport the elevated windrow of crop material from the pick-up mechanism 15 laterally of the direction of travel. An upright wall 25 positioned immediately rearwardly of the cross conveyor 20 prevents the windrow from passing rearwardly beyond the cross conveyor 20 and maintains the windrow on the conveyor 20 to assist the lateral conveyance thereof.

A discharge chute 18 is positioned adjacent the left discharge end 26 of the cross conveyor 20 to receive the windrow being conveyed thereon. The discharge chute 18 is described in greater detail in the aforementioned U.S. Pat. No. 4,793,129, which has been incorporated herein by reference. In typical operation, the windrow of crop material is picked up from the ground by the pick-up mechanism 15 and conveyed rearwardly onto the cross conveyor 20, which transversely conveys the windrow of crop material into the discharge chute 18 for inversion and redepositing upon the ground laterally of the windrow inverter 10 to the left side thereof.

A wing extension 30 is supported by the frame 12 adjacent the right end 27 of the conveyor 20 opposite of the discharge chute 18. Constructed similarly to the cross conveyor 20, the wing extension 30 is provided with an endless draper 32 entrained around longitudinally extending rollers 33 to form a similar, yet independent conveying mechanism immediately outboard of the cross conveyor 20 to the right side thereof. The back wall 25 includes a telescopic portion 35 extendable outboard to the right thereof for cooperative operation with respect to the wing extension 30 when in the lowered operative position in the same manner the back wall 25 is cooperable with the cross conveyor 20. The wing extension includes a discharge end 30a remote from the cross conveyor 20.

The distance from the discharge end 30a and the discharge chute 18 is approximately twice the transverse width of the pick-up mechanism 15 so that a windrow of crop material directed to the ground off the discharge end 30a can be placed adjacent to or on top of a windrow previously deposited during a previous pass of the windrow inverter 10 from the discharge chute 18 while operating in the opposite direction. Accordingly, the windrow inverter 10 with a wing extension 30a attached thereto is operable through reversal of the direction of operation of the cross conveyor 20 on alternate passes across the ground to generally double the volume of crop material for each pass of a subsequent harvesting operation, such as baling.

Referring now to FIGS. 3-6, the latching mechanism 40 interconnecting the wing extension 30 and the frame 12 of the windrow inverter 10 can best be seen. The wing extension 30 includes a subframe 36 which supports the longitudinally extending rollers 33 in their respective orientations. The subframe 36 is pivotable about a pivot axis coinciding with the drive roller 33a and further includes support arms 37 extending downwardly from the subframe 36 and inwardly toward the frame 12 for engagement with rubber bumpers 39. The latching mechanism 40 includes a spring rod 41 pivotally connected to the actuating arm 37a. The spring rod 41 extends in a telescopic manner through a latching bracket 45 affixed to the frame 12 of the windrow inverter 10. The spring rod 41 includes a first slot 42 cut into the upper surface thereof at an intermediate position and a second slot 43 cut into the underside of the spring rod 4 adjacent the end thereof remote from the actuating arm 37a.

Figures 5A, 5B:
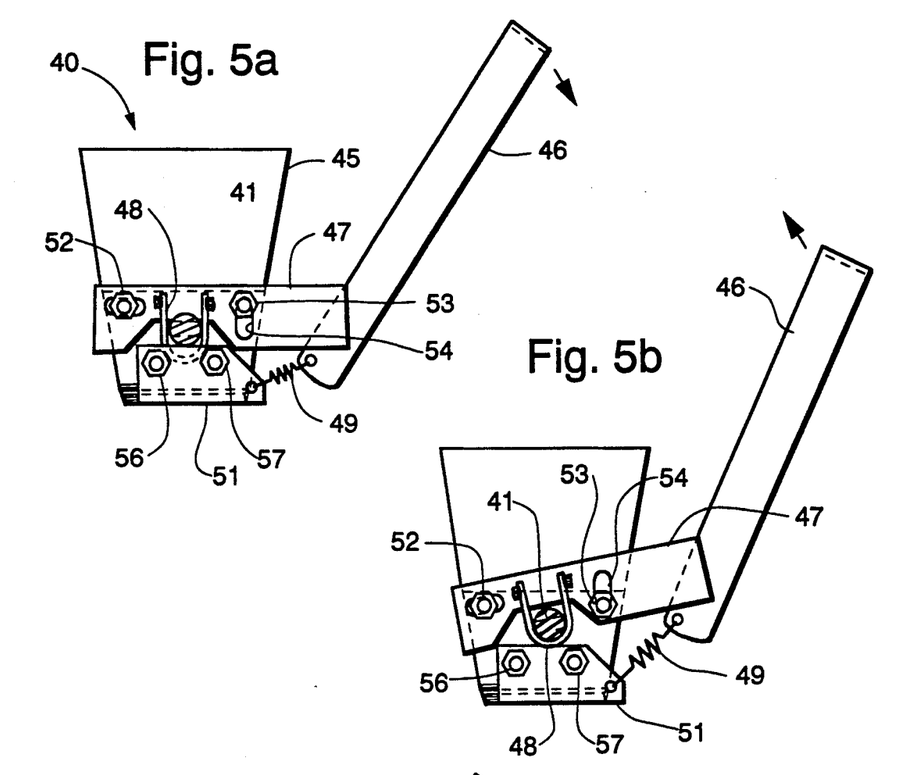
FIG. 5a is a schematic cross sectional view taken along lines 5—5 of FIG. 3 showing the relationship of the components of the latching mechanism with the wing extension in the lowered operative position.
FIG. 5b is a schematic cross sectional view similar to that of FIG. 5a showing the movement of the components of the latching mechanism to effect an unlatching of the wing extension to permit a movement thereof from the lowered operative position to the raised transport position.
Figures 6A, 6B:
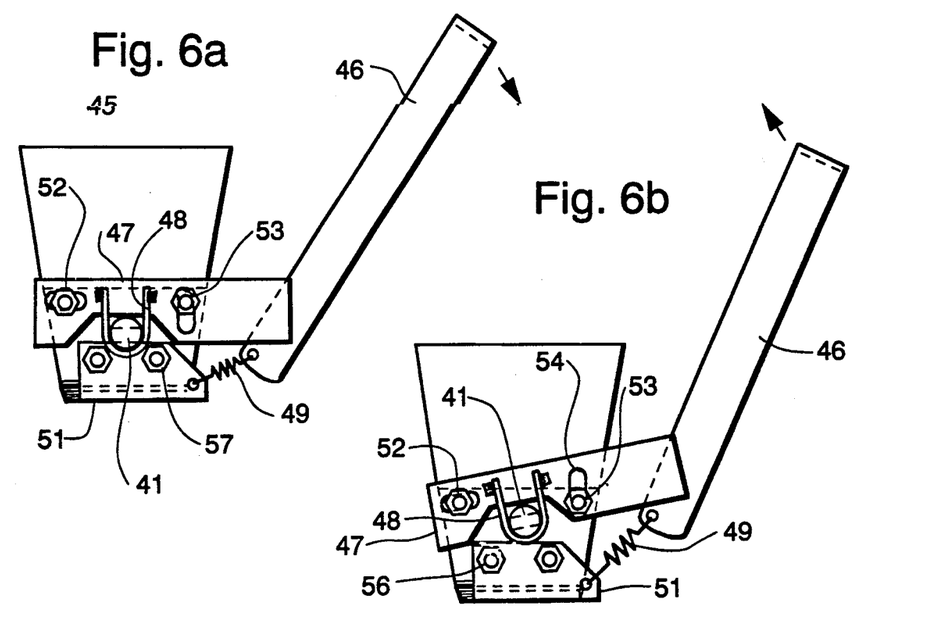
FIG. 6a is a schematic cross sectional view taken along the lines 6—6 of FIG. 4 to show the relative positions of the components, of the latching mechanism with the wing extension being positioned in the raised transport position.
FIG. 6b is a schematic cross sectional view similar to that of FIG. 6a showing the movement of the components of the latching mechanism to unlatch the wing extension to permit movement thereof from the raised transport position to the lowered operative position.

A compression spring 44 is concentrically mounted on the spring rod 41 and positioned between the latching bracket 45 and the actuating arm 37a so as to be compressible therebetween when the wing extension 30 is lowered into its operative position. The latching mechanism 40 also includes an actuating handle 46 attached to a plate 47 pivotally connected to the latching bracket 45 by a pivot bolt 52, as best seen in FIGS. 5 and 6. A limit bolt 53 engaged with the latching bracket 45 through a slotted opening 54 in the plate 47 limits the amount of pivotal movement allotted to the pivot plate 47. Both of the bolts 52, 53 permit an adjustable movement of the pivot plate 47 toward and away from the latching bracket 45.

The plate 47 carries an inverted bail or yoke 48 encircling the spring rod 41 for telescopically supporting the spring rod 41. A tension spring 49 interconnecting the actuating handle 46 and a locking plate 51 attached to the latching bracket 45 by adjustment bolts 56, 57 biases the pivoted plate 47 into a downward position to urge the plate 47 against the spring rod 41. The adjustment bolts 56, 57 permit a limited amount of adjustable movement of the locking plate 51 toward and away from the latching bracket 45 to assure proper engagement with the second slot 43 in the spring rod 41, as described in greater detail below.

Figure 3:
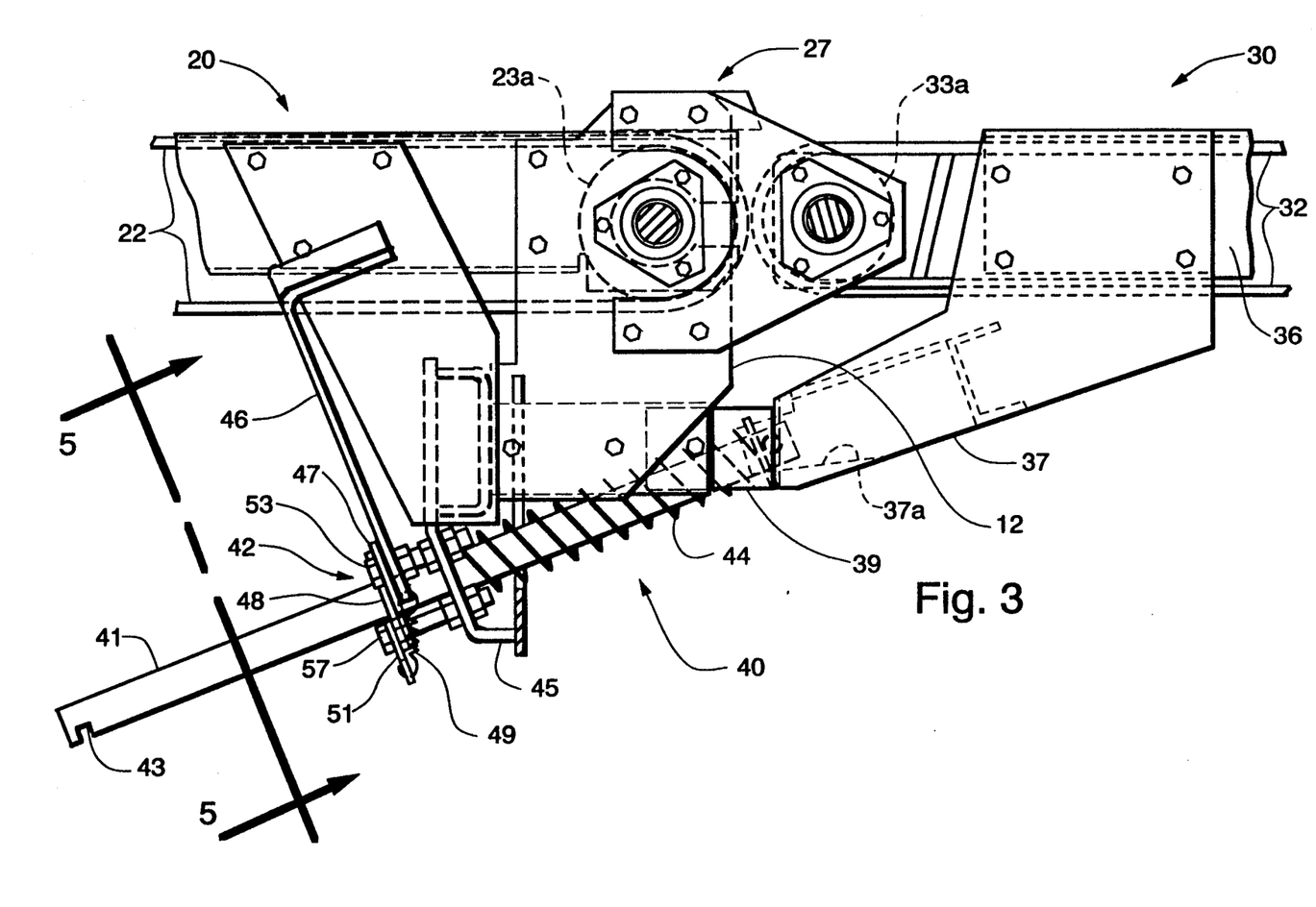
FIG. 3 is an enlarged cross sectional view taken along lines 3—3 of FIG. 2 to show a rear elevational view of the latching mechanism interconnecting the wing extension and the frame of the windrow inverter, the wing extension being shown in the lowered operative position.

When the wing extension 30 is in the lowered operative position, as shown in FIGS. 3 and 5a, the spring rod 41 has been extended through the latching bracket 45 and the yoke 48 until the plate 47 has engaged the first slot 42 formed in the upper surface of the spring rod 41. In this position, the compression spring 44 is compressed between the actuating arm 37a and the latching bracket 45, and is biasing the wing extension 30 upwardly, except that the movement thereof is restrained by the engagement between the plate 47 and the first slot 42 in the spring rod 41. Also in this position, the supporting arms 37 contact the rubber bumpers 39 to require a downward force to be exerted on the wing extension 30 to allow the plate 47 to engage the slot 42 and retain the wing extension 30 in the lowered operative position.

Figure 4:
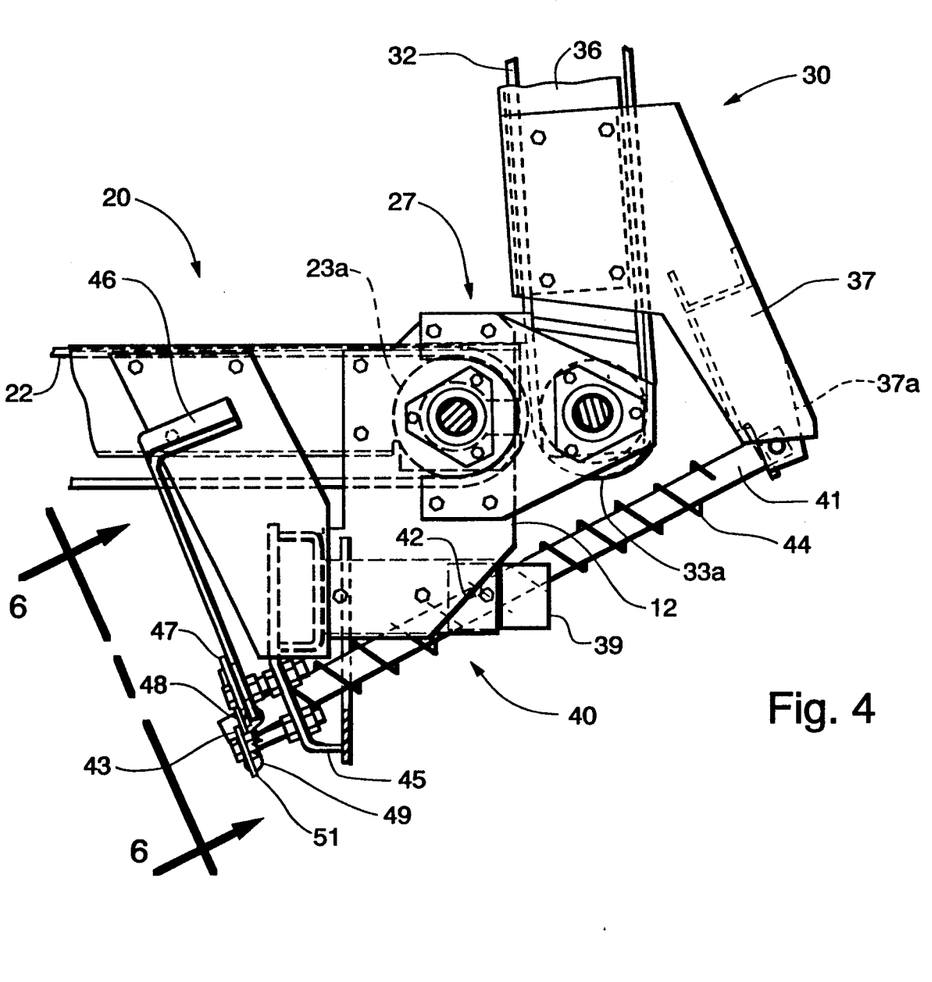
FIG. 4 is a cross sectional view similar to that of FIG. 3 showing a rear elevational view of the latching mechanism with the wing extension being moved to the raised transport position.

The tension spring 49 helps retain the pivoted plate 47 in engagement with the first slot 42, as does the axial load on the spring rod 41 exerted by the compression spring 44 and the compressed rubber bumpers 39. In contrast, the movement of the wing extension 30 to the raised transport position is shown in FIGS. 4 and 6a, effects a retraction of spring rod 41 through the latching bracket 45 and yoke 48 until the second slot 43 is engaged with a locking plate 51 attached to the latching bracket 45. In this position, the compression spring 44 is relaxed, while the tension spring 49 interconnecting the locking plate 51 and the actuating handle 46 pulls downwardly on the plate 47 and pushes the spring rod 41 against the locking plate 51 to effect engagement with the second slot 43.

Referring now to FIGS. 3-6, the operation of the latching mechanism 40 can best be seen, beginning with the wing extension 30 in the lowered operative position, as shown in FIGS. 3 and 5a with the tension spring 49 urging the pivoted plate 47 into engagement with the first slot 42 cut into the spring rod 41, the operator must manually move the actuating handle 46 upwardly, as shown in FIG. 5b, against the tension spring 49 to pivotally move the plate 47 upwardly, thereby disengaging the plate 47 from the first slot 42. Since the compression spring 4 is biasing the wing extension 30 in an upward direction, the release of the plate 47 from the first slot 42 results in an immediate upward movement of the wing extension 30, particularly due to the force exerted by the compressed rubber bumpers 39, sufficiently far so that there can be no re-engagement between the plate 47 and the first slot 42 formed in the upper surface of the spring rod 41 allowing a release of the handle 46 to raise the wing extension 30.

Upon release of the actuating handle 46, the tension spring 49 returns the handle 46 downwardly, the spring rod 41 becomes trapped between the pivoted plate 47 and the locking plate 51 until the wing extension 30 is manually raised into the transport position, as shown in FIG. 4, whereby the second slot 43 engages the locking plate 51. The tension spring 49 urging the pivoted plate 47 against the spring arm 41 bias the spring arm 41 against the locking plate 51 to effect an automatic engagement of the locking plate 51 with the second slot 42 when the wing extension 30 has been raised to the proper transport position.

Conversely, a return of the wing extension 30 to the lowered operative position requires again a manual raising of the actuating handle 46 which effects a disengagement of the locking plate 51 from the second slot 43 formed in the underside of the spring rod 41 due to the upward lifting exerted by the yoke 48. The weight of the wing extension 30, since it is not being supported by the operator lowers against the compression spring 44 and telescopically moves the spring rod 41 through the latching bracket 45 and yoke 48 until an equilibration position is attained and/or the supporting arms 37 contact the rubber bumpers 39.

To re-engage the pivoted plate 47 with the first slot 42 formed in the upper side of the spring rod 41, as urged by the tension spring 49 upon the manual release of the actuating handle 46, the operator must then manually exert additional downward movement to the wing extension 30 to effect a compression of the rubber bumpers 39 until the second slot 43 is engaged with the pivoted plate 47, which consequently corresponds to the wing extension 30 being moved into the operative position, as shown in FIG. 3.

The back wall extension 25a is supported by the frame 12 for sliding movement relative to the fixed back wall 25. The back wall extension 25a can be manually retracted along the back wall 25 whenever the wing extension 30 is moved into the raised transport position, as shown in FIG. 1. To prevent crop material from falling rearwardly off the wing extension 30, the back wall extension 25a can be manually slid into its extended position shown in FIG. 2 and in phantom in FIG. 1, when the wing extension 30 is moved into the lowered operative position.

Figure 7:
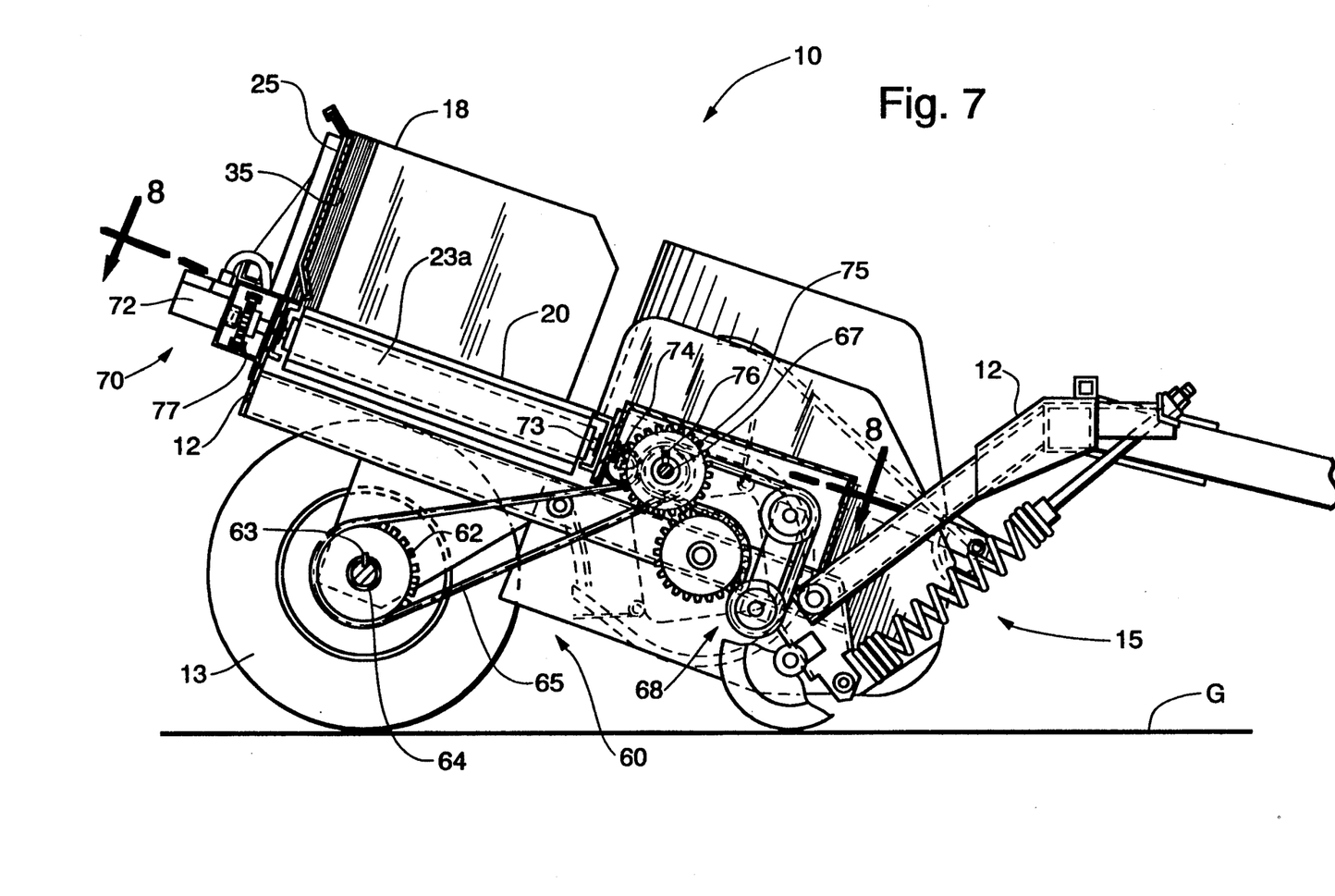
FIG. 7 is a cross sectional view taken along lines 7—7 of FIG. 2 to show the drive mechanism for the windrow inverter pick-up mechanism and cross conveyor, portions of the windrow inverter hitch, the pick-up mechanism, and the latching mechanism being broken away for purposes of clarity.
Figure 8:
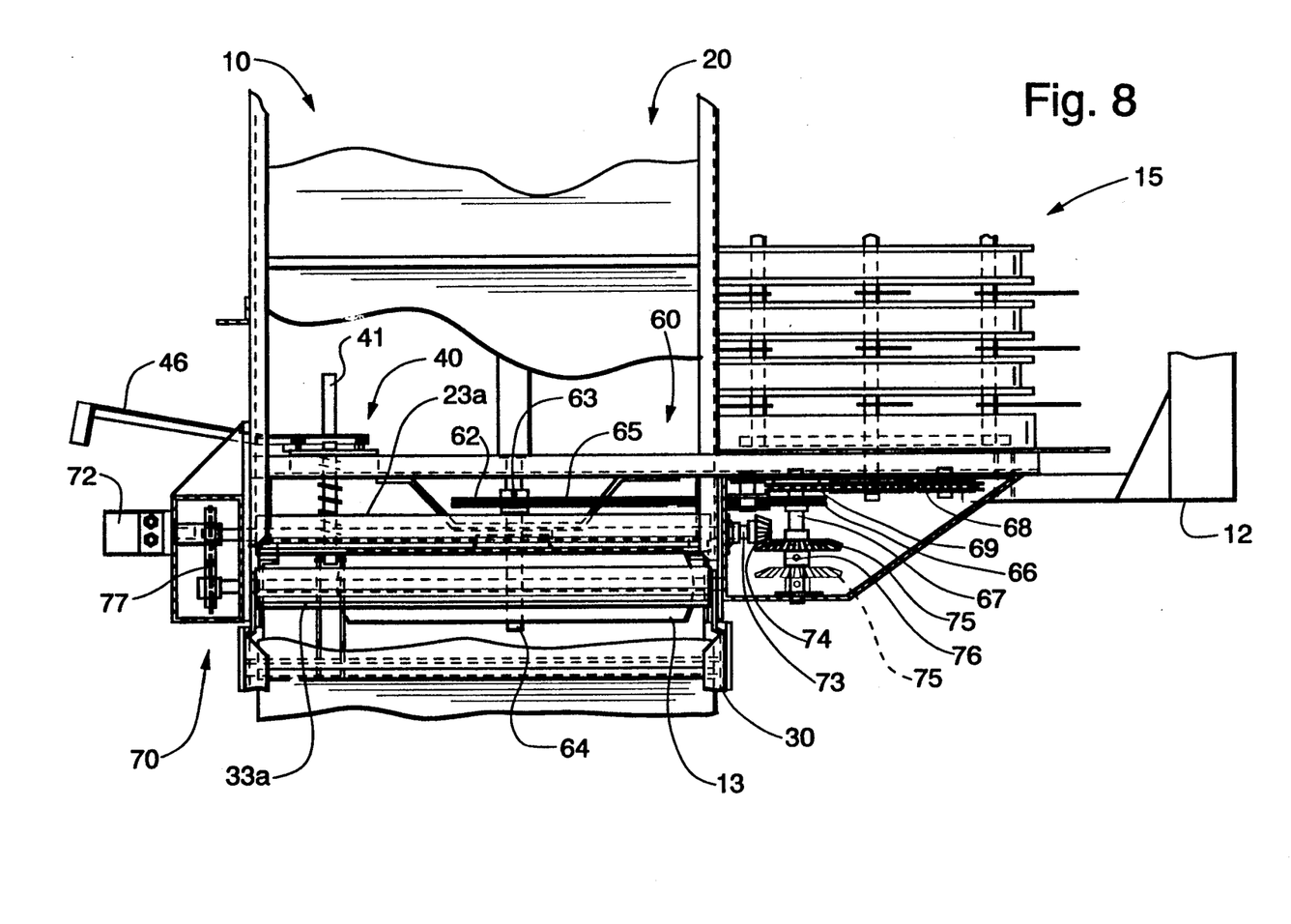
FIG. 8 is a cross sectional view taken along lines 8—8 of FIG. 7 to show a top plan view of the drive mechanism operatively powering the pick-up mechanism, cross conveyor, and wing extension.

Referring now to FIGS. 7 and 8, the drive mechanism 60 for the windrow inverter 10, including the pick-up mechanism 15, cross conveyor 20 and wing extension 30, can best be seen. A drive sprocket 62 is connected to the axle 64, interconnecting the transversely spaced ground wheels 13, by a pin 63 such that the drive sprocket 62 is rotatable with the axle 64 when the windrow inverter 10 is moveable over the ground G. An endless chain 65 entrained around the drive sprocket 62 and a driven sprocket 66 fixed to a jack shaft 67 transfers rotational motion from the movement of the wheels 13 and axle 64 over the ground G to the driven sprocket 66.

A second drive sprocket 69 forming part of a conventional pick-up chain drive 68 is also mounted on the jack shaft 67 and is rotatable therewith. As a result, rotational power is transferred from the ground wheels 13 through the chain 65 and chain drive mechanism 68 to effect a rotation of the pick-up mechanism 15 in a conventional manner when the windrow inverter 10 is moved over the ground G. Since the pick-up mechanism 15 need only be operable to elevate a windrow of crop material from the ground G when the windrow inverter 10 is moving, the provision of a ground drive mechanism 60 to effect a rotation of the pick-up mechanism 15 is operationally acceptable.

A hydraulic drive mechanism 70 is also provided for the windrow inverter 10. The hydraulic drive mechanism 70 includes a hydraulic motor 72 connected to the tractor (not shown) through the tractor's hydraulic system in a conventional manner to provide operational power to the hydraulic motor. The hydraulic motor 72 is connected directly to the right cross conveyor roller 23a to drive directly the rotation thereof and, through frictional engagement with the draper 22, effect a driving of the cross conveyor 20. A chain coupler 77 interconnects the right drive roller 23a of the cross conveyor 20 with the left drive roller 33a of the wing extension 30 to effect a driving of the wing extension draper 32 through frictional engagement with the drive roller 33a.

Since the chain coupler drivingly connects the right roller 23a of the cross conveyor 20 directly with the left roller 33a of the wing extension 30, the respective drapers 22, 32 will be operatively driven in the same direction. The sprockets on the right drive roller 23a and the left drive roller 33a engaged with the chain coupler 77 are sized to cause a rotation of the wing extension draper 32 at least as fast, and preferably slightly faster, than the draper 22 to prevent crop material from bunching up between the drapers 22, 32 an/or falling between the drapers 22, 32.

A stub shaft 73 extends forwardly of the right drive roller 23a of the cross conveyor 20 and terminates in a pinion 74 engageable with a power transfer mechanism, interconnecting the pinion 74 and the chain drive mechanism 68. The pinion 74 is directly engageable with a transfer gear 75 mounted on the jack shaft 67. The transfer gear 75 is slidable along the jack shaft 67 and is fixed into a selected position by a set screw 76, as indicated in phantom in FIG. 8. If the transfer gear 75 is engaged with the pinion 74, as shown in solid lines in FIG. 8, the rotational power delivered from the hydraulic motor 72 is transferred directly to the jack shaft 67 and thereby effectively drives the pick-up mechanism 15 independently of the rotation of the ground wheels 13. One skilled in the art will readily realize that the engagement of the transfer gear 75 with the corresponding pinion 74 will require a disengagement between the drive sprocket 62 and the axle 64 by removal of the pin 63 so that the drive sprocket 62 can rotate relative to the axle 64 as driven through connection to the chain 65 entrained around the driven sprocket 66 fixed to the jack shaft 67.

Under such conditions, the entire operative components of the windrow inverter 10, i.e., the pick-up mechanism 15, the cross conveyor 20, and the wing extension 30, are hydraulically driven from the hydraulic drive mechanism 70; however, because the pick-up mechanism 15 can be driven in only one direction to be operable, the drapers 22, 32 would only be operable in one direction to convey crop material toward the discharge chute 18. To provide the greatest flexibility of operation, it is recommended that the transfer gear 75 be moved out of engagement with the pinion 74 so that the pick-up mechanism 15 will be ground driven while the drapers 22, 32 will be hydraulically driven.

The repositioning of the transfer gear 75 to a position shown in phantom in FIG. 8 which is disengaged from the pinion 74 disengages the hydraulic drive mechanism 70 from the ground drive mechanism 60 and permits the pick-up mechanism 15 to operatively driven from the rotation of the ground wheels 13 as described above, with the drive sprocket 62 being pinned to the axle 64 as previously noted. As a result, the hydraulic drive mechanism 70 can be utilized to rotate the drapers 22, 32 continuously, while the ground drive mechanism 60 drives the pick-up mechanism 15 only when the windrow inverter 10 is moved over the ground at G.

The shiftable transfer gear 75 also provides the option of driving the cross conveyor 20 and the wing extension 30 through the ground drive mechanism 60. First, however, one skilled in the art will readily realize that the hydraulic motor 72 would have to be disconnected and/or removed from the windrow inverter 10 to prevent damage thereto and reduce the power requirements for driving the drapers 22, 32 to limits producible by the ground drive mechanism 60. The rotational power delivered by the chain 65 from the ground wheels 13 is transferred via the jack shaft 67 through the transfer gear 75 and pinion 74 to effect a rotation of the cross conveyor draper 22 in one direction only toward the discharge chute 18. A loosening of the wing extension draper 32 relative to its drive roller 33a would prevent the operation of the wing extension 30, if desired to reduce power requirements further. This drive option enables the wing extension 30 and the hydraulic drive mechanism 70 to be an optional feature for the windrow inverter 10.

Figure 9:
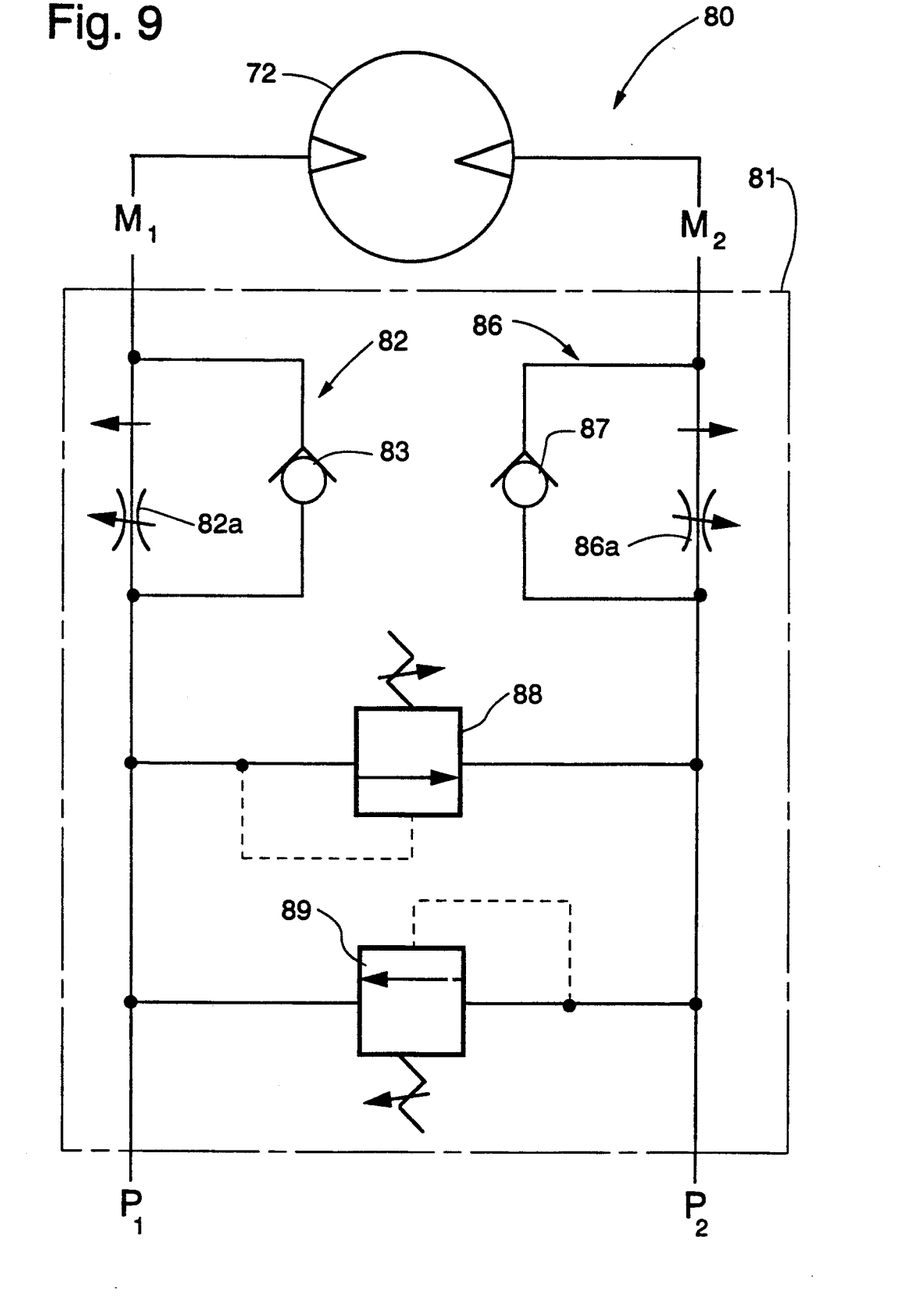
FIG. 9 is a schematic view of the hydraulic circuit forming part of the hydraulic system incorporated in the drive mechanism for the windrow inverter as shown in FIGS. 7 and 8.

The hydraulic drive mechanism 70 includes a hydraulic circuit 80, incorporating a hydraulic valve 81 as shown in FIG. 9, which enables the hydraulic motor 72 to be operated in either direction from the tractor (not shown) with independent control over the speed thereof in either selected direction of operation. The hydraulic motor 72 has flow ports $M_1$, $M_2$ connected to the valve 81. Flow ports $P_1$, $P_2$ of the valve 81 are connected to the tractor hydraulics (not shown) through traditional hydraulic connectors. A first one-way flow regulator mechanism 82, incorporating a check valve 83, controls the rate of flow of hydraulic fluid from port $P_1$ through the circuit and back to port $P_2$, the check valve 83 requiring the flow of hydraulic fluid to pass through the flow regulator 82a. Likewise, a second one-way flow regulator mechanism 86, incorporating a check valve 87, controls the rate of flow of hydraulic fluid from port $P_2$ back through the hydraulic motor 72 and back to tractor port $P_1$, the check valve 87 requiring the flow of fluid through the flow regulator 86a.

The check valve 87 permits the flow of fluid to bypass the flow regulator 86a whenever the flow of hydraulic fluid passes from Port $P_1$ to port $P_2$ as the check valve 83 allows fluid to bypass the flow regulator 82a when the flow of fluid passes from port $P_2$ back to $P_1$. As a result, the rate of flow can be independently set for operation of the hydraulic motor 72 in either direction as the rate of movement of the drapers 22, 32 to discharge crop material over the wing extension 30 may be desired to be at a greater speed than the operation of the draper 22 to convey crop material into the discharge chute 18.

The hydraulic circuit 80 also includes first and second one-way pressure compensated relief valves 88, 89 to divert a flow of hydraulic fluid from the hydraulic motor 72 when the hydraulic circuit 80 is connected to a tractor utilizing an open hydraulic circuit. For open-center tractor hydraulic systems, the two pressure compensated relief valves 88, 89 are set according to the flow output of the tractor hydraulic system with a pressure setting lower than the relief for the tractor hydraulics to divert the flow of excess hydraulic fluid from the hydraulic motor 72 irrespective of the selected direction of fluid flow between the tractor ports $P_1$ and $P_2$.

When the hydraulic circuit 80 is connected to a tractor (not shown) utilizing a closed hydraulic system, the pressure compensated relief valves 88, 89 are closed by setting them to maximum pressure, or at least at a pressure higher than the tractor system pressure, to allow the entire flow to pass through the hydraulic motor 72. As a result, the windrow inverter 10 can be connected to a tractor (not shown) utilizing either an open or a closed hydraulic system and can provide substantially infinite control of flow through the hydraulic motor and, thereby, control the speed of operation of the cross conveyor 20 and wing extension 30 independently in either direction, i.e., for movement of the crop material toward the discharge chute 18 or for movement of the crop material for discharge off the wing extension 30.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a windrow inverter having a frame adapted for movement over the ground along a direction of travel; a crop pick-up mechanism supported from said frame for engagement of crop material lying on the ground and elevating the crop material above the ground; a cross conveyor having first and second transversely spaced ends and being supported by said frame rearwardly of the pick-up mechanism to receive the crop material elevated by said pick-up mechanism and laterally convey said crop material; a discharge chute mounted on said frame adjacent said first end of said cross conveyor in flow communication with said cross conveyor to receive crop material laterally conveyed thereby, said discharge chute being operable to deposit said crop material on the ground in a positioned spaced laterally of the position in which the crop material was engaged by said pick-up mechanism; and drive means for operatively powering the operation of said pick-up mechanism and said cross conveyor, the improvement comprising:

a wing extension supported from said frame adjacent said second end of said cross conveyor in flow communication therewith to continue the lateral movement of crop material discharged from said cross conveyor, said wing extension being operable to discharge crop material laterally of said windrow inverter to the opposing side from said discharge chute; and said drive means including means for selectively driving said cross conveyor in opposing lateral directions.

2. The windrow inverter of claim 1 wherein said cross conveyor and said wing extension are draper conveyors having respective endless drapers oriented transversely to the direction of travel, said wing extension having a discharge end positioned remotely from said cross conveyor.

3. The windrow inverter of claim 2 wherein said drive means includes a hydraulic motor operatively connected to said cross conveyor and said wing extension to effect rotation of the respective said drapers, said hydraulic motor being selectively operable to rotate said drapers in opposing directions.

4. The windrow inverter of claim 3 wherein said wing extension is pivotally mounted on said frame to be selectively movable between a raised transport position and a lowered operative position.

5. The windrow inverter of claim 4 wherein said hydraulic motor is operable to rotate the corresponding said draper irrespective of the pivoted position of said wing extension.

6. The windrow inverter of claim 5 wherein the distance between said discharge end of said wing extension and said discharge chute is approximately equal to twice the transverse width of said pick-up mechanism so that said wing extension may be positioned to discharge a windrow of crop material from said discharge end adjacent to a windrow previously deposited on the ground by said discharge chute.

7. The windrow inverter of claim 6 further including a back wall supported on said frame rearwardly of said cross conveyor to prevent crop material elevated by said pick-up mechanism from passing rearwardly of said cross conveyor, said back wall having a wall extension member telescopically supported thereon, said back wall extension being positionable for cooperation with said wing extension when in said lowered operative position to prevent crop material from passing rearwardly thereof before reaching said discharge end.

8. The windrow inverter of claim 6 wherein said hydraulic motor is drivingly connected to the respective drapers of both said cross conveyor and said wing extension for the simultaneous rotation thereof in the same selected direction.

9. A windrow inverter comprising:
- a frame supported for movement over the ground along a direction of travel by a pair of ground wheels;
- a crop pick-up mechanism supported from said frame for engagement of crop material lying on the ground and elevating the crop material above the ground;
- a cross conveyor supported by said frame rearwardly of the pick-up mechanism to receive the crop material elevated by said pick-up mechanism, said cross conveyor including a rotatable endless transverse draper terminating at first and second transversely spaced ends to effect a lateral conveyance of said crop material;
- a discharge chute mounted on said frame adjacent said first end of said cross conveyor in flow communication with said cross conveyor to receive crop material laterally conveyed thereby, said discharge chute being operable to deposit said crop material on the ground in a positioned spaced laterally of the position in which the crop material was engaged by said pick-up mechanism;
- a wing attachment pivotally supported from said frame adjacent said second end of said cross conveyor in flow communication therewith and being pivotally moveable between a raised transport position and a lowered operative position, said wing attachment having a separate rotatable endless draper operable when said wing attachment is in the lowered operative position to continue the lateral movement of crop material discharged from said cross conveyor draper onto said wing attachment, said wing attachment being further operable to discharge crop material laterally of said windrow inverter to the opposing side from said discharge chute, said wing attachment draper terminating in a discharge end remote from said cross conveyor draper; and
- drive means for operatively powering the operation of said pick-up mechanism, said cross conveyor draper, and said wing attachment draper, said drive means being selectively operable to effect a driving of said cross conveyor draper in opposing lateral directions, said drive means being further operable to drive said wing attachment draper in the same selected direction as said cross conveyor draper.

10. The windrow inverter of claim 9 further including a back wall supported on said frame rearwardly of said cross conveyor to prevent crop material elevated by said pick-up mechanism from passing rearwardly of said cross conveyor draper, said back wall having a wall extension member telescopically supported thereon, said back wall extension being positionable for cooperation with said wing attachment when in said lowered operative position to prevent crop material from passing rearwardly of said wing attachment draper before reaching said discharge end.

11. The windrow inverter of claim 10 wherein said drive means includes a hydraulic motor operatively connected to said cross conveyor and said wing attachment to effect rotation of the respective said drapers, said hydraulic motor being selectively operable to rotate said drapers in opposing directions irrespective of the pivoted position of said wing attachment, said drive means further including a coupler drivingly interconnecting the respective endless drapers of both said cross conveyor and said wing attachment so that said hydraulic motor can effect a simultaneous rotation of both said drapers in the same selected direction.

12. The windrow inverter of claim 11 wherein said wing attachment further includes a first longitudinally extending roller positioned adjacent said cross conveyor and a second longitudinally extending roller positioned at said discharge end, the corresponding said draper being entrained around said first and second rollers, said wing attachment being pivotable about a pivot axis coinciding with said first roller.

* * * * *